(12) United States Patent
Marino

(10) Patent No.: US 10,131,287 B1
(45) Date of Patent: Nov. 20, 2018

(54) COLLAPSIBLE CARGO RACK

(71) Applicant: James F. X. Marino, Winchester, MA (US)

(72) Inventor: James F. X. Marino, Winchester, MA (US)

(*) Notice: Subject to any disclaimer, the term of this patent is extended or adjusted under 35 U.S.C. 154(b) by 0 days.

(21) Appl. No.: 15/497,767

(22) Filed: Apr. 26, 2017

(51) Int. Cl.
   *B60R 9/045* (2006.01)
   *B60R 11/00* (2006.01)

(52) U.S. Cl.
   CPC ....... *B60R 9/045* (2013.01); *B60R 2011/0082* (2013.01)

(58) Field of Classification Search
   CPC .................. B60R 9/045; B60R 2011/0082
   USPC ..................... 224/405, 506; 296/3
   See application file for complete search history.

(56) References Cited

U.S. PATENT DOCUMENTS

| 265,878 | A |  | 10/1882 | Shafer |  |
|---|---|---|---|---|---|
| 4,398,763 | A |  | 8/1983 | Louw |  |
| 4,413,761 | A | * | 11/1983 | Angel | B60R 9/06 211/86.01 |
| 5,009,457 | A |  | 4/1991 | Hall |  |
| 5,037,152 | A |  | 8/1991 | Hendricks |  |
| 5,108,141 | A | * | 4/1992 | Anderson | B60R 9/00 211/182 |
| 5,152,570 | A |  | 10/1992 | Hood |  |
| 5,303,858 | A |  | 4/1994 | Price |  |
| 5,423,587 | A | * | 6/1995 | Ingram | B60P 3/32 135/88.13 |
| 5,431,472 | A |  | 7/1995 | Coffland |  |
| 6,186,571 | B1 | * | 2/2001 | Burke | B60P 3/40 224/405 |
| 6,644,704 | B1 | * | 11/2003 | Nyberg | B60P 3/40 224/405 |
| 7,494,169 | B2 |  | 2/2009 | Collins |  |
| 7,513,548 | B1 |  | 4/2009 | Win |  |
| 7,641,251 | B1 | * | 1/2010 | Stepanians | B60P 3/40 224/405 |
| 7,758,091 | B1 |  | 7/2010 | McCall |  |
| 7,959,200 | B2 | * | 6/2011 | Voglmayr | B60P 3/40 296/100.05 |
| 8,113,563 | B1 | * | 2/2012 | McCann | B60P 3/40 224/405 |
| 8,550,527 | B1 | * | 10/2013 | Win | B60P 3/40 224/402 |
| 8,777,288 | B2 |  | 7/2014 | Johnasen |  |

(Continued)

*Primary Examiner* — Justin Larson
(74) *Attorney, Agent, or Firm* — Thomas P. O'Connell; O'Connell Law Firm

(57) ABSTRACT

A collapsible cargo rack with storage and use configurations. Right and left rack subassemblies are secured to sidewalls of a truck bed. A lateral support member has ends selectively retained by the rack subassemblies, each with a support arm retained by a pivot mount at a longitudinal pivot axis to pivot from an upright position for supporting cargo to a retracted, visually and practically unobtrusive position. The pivot axes are disposed below the upper edges and inwardly of the sidewalls. The support arms can be selectively fixed in the upright position by set pins at an inward angle α. Distal segments of the arms can be outwardly angled by the angle α thereby to be substantially vertical and parallel. Sleeves fixed to the ends of the lateral support member matingly receive the distal segments of the support arms, which can have lengths greater than the heights of the sleeves.

28 Claims, 11 Drawing Sheets

(56) References Cited

U.S. PATENT DOCUMENTS

| | | | |
|---|---|---|---|
| 9,102,275 B1* | 8/2015 | DeZonia | B60R 9/04 |
| 9,487,152 B2* | 11/2016 | Scott | B60P 3/40 |
| 9,663,039 B2* | 5/2017 | Marmon | B60D 1/58 |
| 9,676,358 B2* | 6/2017 | Schlup, Jr. | B60R 21/131 |
| 2002/0125728 A1* | 9/2002 | Chambers | B62D 33/08 |
| | | | 296/3 |
| 2004/0134953 A1* | 7/2004 | Perez | B60P 3/40 |
| | | | 224/403 |
| 2001/0127790 | 6/2011 | Mokhtari | |
| 2013/0229025 A1* | 9/2013 | Johnasen | B60P 3/00 |
| | | | 296/3 |
| 2014/0197653 A1 | 7/2014 | Stepanians | |
| 2014/0239025 A1* | 8/2014 | Scott | B60R 9/045 |
| | | | 224/405 |
| 2014/0305978 A1* | 10/2014 | Austrie | B62D 33/0207 |
| | | | 224/405 |
| 2015/0258940 A1* | 9/2015 | Breeden, III | B60R 9/0485 |
| | | | 224/405 |

* cited by examiner

COLLAPSIBLE CARGO RACK

FIELD OF THE INVENTION

The present invention relates generally to support structures for use in relation to motor vehicles. More particularly, disclosed herein is a collapsible cargo rack with a use configuration for permitting the support and transport of elongate cargo and a visually and practically unobtrusive storage configuration.

BACKGROUND OF THE INVENTION

A pickup truck is a utility vehicle with a truck cab for transporting passengers and a truck bed for transporting cargo. Typically, the truck bed is defined by a generally flat floor, upstanding left and right side walls that project generally vertically from left and right edges of the floor, and an upstanding front wall that spans between the anterior ends of the left and right sidewalls and projects generally vertically from the anterior edge of the floor. A rear wall or tailgate is typically retained pivotally adjacent to the posterior edge of the floor to selectively span between the posterior ends of the left and right sidewalls when the tailgate is in a generally vertical disposition. The tailgate can be pivoted to a disposition generally in the same plane as the floor thereby opening the truck bed and effectively extending the length of the floor as a flat surface for transporting cargo and permitting access to the storage volume defined by the floors and walls of the truck bed.

Although of great utility, the capacity of the pickup truck bed is inherently limited by its dimensions. The length and width of the floor, the distances between the left and right sidewalls and between the front wall and the tailgate, and the heights of the walls and tailgate impose limitations on the length of the cargo that can fit within and be retained by the truck bed. A further boundary is provided by the upstanding cab disposed anterior to the truck bed. Boards, pipes, canoes, kayaks, and other stock and cargo too long to fit within the truck bed must be transported, if at all, with their ends cantilevered over the edges of the truck bed or over the vehicle's cab. This method is decidedly unstable, and unintended shifting can lead to dangerous consequences and damage to the vehicle and the cargo itself. Cargo too long even for that haphazard method of transport may simply be beyond the capacity of the vehicle.

Advantageously, the prior art has disclosed rack systems for pickup trucks and other vehicles that are intended to provide level support to such elongate articles. Typically, such racks have one or perhaps two support structures with a support surface normally provided at a level approximately equal to or higher than the top of the cab of the truck. For instance, a support structure may have one or more upright members or other portions fixed immediately behind the truck cab with a laterally communicating upper support bar. Additionally or alternatively, a support structure, typically with fixed upstanding legs and a laterally communicating support bar, may be secured adjacent to the posterior end of the truck bed. Particularly where anterior and posterior structures are provided, such fixed rack systems establish a level basis of support above the truck bed. With that, cargo longer than the truck bed can be disposed atop the support structures and transported.

While useful, such cargo racks of the prior art are unfortunately fixed in their upright configurations, even during periods of non-use. As a result, fixed cargo racks can be objectionable in appearance to users who have no choice but to present a truck with exposed racks that have a decidedly utilitarian and otherwise unattractive appearance. Moreover, such fixed racks can present obstacles to other uses of the truck. Still further, fixed racks require added clearance for passage of the truck under, for example, overhangs, garage doors, and parking facilities.

It would thus be ideal to have the utility of the cargo rack when needed but to have the ability to minimize or substantially eliminate the deleterious appearance and repercussions of the cargo rack when the rack is not in use. To that end, a number of skilled inventors have proposed collapsible cargo racks for vehicles that can be manipulated between use and non-use configurations. With a studied knowledge of the prior art, one will be aware that the disclosed adjustable racks have demonstrated a plurality of limitations that have prevented widespread use and commercialization. For example, many collapsible racks, such as those of U.S. Pat. No. 5,037,152 to Hendricks and U.S. Pat. No. 5,431,472 to Coffland, are structurally complex and rely for their stability and integrity a stable relationship between multiple adjustable components. Particularly over time, such stability is unlikely to be achieved reliably. Moreover, many adjustable racks, such as that of U.S. Pat. No. 8,777,288 to Johnasen, although pivotable between use and storage configurations, are incapable of pivoting to a substantially unobtrusive position. Accordingly, even when in a storage configuration, many adjustable racks of the prior art continue to obstruct full use of the truck bed and interfere with the intended appearance of the truck.

It is thus apparent that, despite the many adjustable cargo racks known to the prior art, there remains a need for a rack that is elegant in structure and operation that is adjustable between storage and use configurations to provide stable, reliable support during use while permitting adjustment to a position that is unobstructive in location and appearance during periods of non-use so that a pickup truck can have the utility of a cargo rack when desired while having the substantial appearance of being without a rack when the rack is not needed.

SUMMARY OF THE INVENTION

The present invention is thus founded on the basic object of providing a cargo rack that is adjustable between a storage configuration where the rack provides support for cargo and a collapsed configuration where the location and appearance of the rack components are minimized.

A more particular object of the invention is to provide a collapsible rack that permits a pickup truck to have the utility of a cargo rack when desired while having the general appearance of being without a rack when the rack is not needed.

Another particular object of the invention is to provide a collapsible cargo rack with components of mutually stabilizing construction that render the rack reliable and stable when in a use configuration.

A further object of embodiments of the invention is to provide collapsible cargo rack that can be adjusted between storage and use configurations without a need for dedicated tools and in a rapid and efficient manner.

These and further objects and advantages of the present invention will become obvious not only to one who reviews the present specification and drawings but also to those who have an opportunity to experience an embodiment of the collapsible cargo rack disclosed herein. It will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the objects of the invention, the disclosed collapsible cargo rack has a storage configuration and a use configuration. The collapsible cargo rack can be applied, such as originally by a truck manufacturer or as a subsequently fitted attachment, to a vehicle, such as a pickup truck with a truck bed with a left sidewall and a right sidewall, each sidewall with an upper edge and an inner surface. The collapsible cargo rack can have, for example, one collapsible cargo rack assembly retained adjacent to a posterior end of the truck bed or adjacent to an anterior end of the truck bed, or multiple cargo rack assemblies can be used, such as by having a first cargo rack assembly disposed adjacent to the posterior end of the truck bed and a second cargo rack assembly disposed adjacent to the anterior end of the truck bed.

Each collapsible cargo rack assembly can have a left rack subassembly for being secured to the left sidewall of the truck bed, a right rack subassembly for being secured to the right sidewall of the truck bed, and a lateral support subassembly for being selectively retained by the left and right rack subassemblies when the collapsible cargo rack is in a use configuration. Each of the left and right rack subassemblies has a pivot mount and a support arm pivotally retained by the pivot mount at a pivot axis of the support arm. Each support arm has an elongate proximal segment and a distal segment. The pivot axis of each support arm is substantially longitudinally aligned with the truck bed, and each support arm can be pivoted from an upright position to a retracted position. The lateral support subassembly comprises a lateral support member with a first end adapted selectively to engage the distal segment of the support arm of the left rack subassembly and a second end adapted selectively to engage the distal segment of the support arm of the right rack subassembly.

The collapsible cargo rack assembly can be disposed in the use configuration with the support arm of each of the left and right rack subassemblies pivoted to the upright position, the first end of the lateral support member engaged with the distal segment of the support arm of the left rack subassembly, and the second end of the lateral support member engaged with the distal segment of the support arm of the right rack subassembly. The collapsible cargo rack assembly can be reconfigured to the storage configuration by a disengagement of the first and second ends of the lateral support member from the distal ends of the support arms and a pivoting of the support arms to the retracted position.

In embodiments of the cargo rack assembly, the pivot mount of each of the left and right rack subassemblies establishes the pivot axis of the support arm below the upper edge of the left and right sidewalls respectively. Moreover, the pivot mount of each of the left and right rack subassemblies can establish the pivot axis of the support arm inwardly toward a centerline of the truck bed relative to the left and right sidewalls respectively. With that, the pivot axes can be disposed inwardly of the sidewalls and below the upper edges of the sidewalls, and the support arms can be readily pivoted to an unobtrusive storage configuration entirely below the upper edges of the sidewalls and inboard of the sidewalls.

The pivot mount of the left rack subassembly can take the form of an inboard member, such as an inboard plate, for being fixed against the inner surface of the left sidewall of the truck bed and a pivot member, such as a pivot plate, that extends from the inboard member. The pivot axis is retained by the pivot member. In a like manner, the pivot mount of the right rack subassembly comprises an inboard member for being fixed against the inner surface of the right sidewall of the truck bed and a pivot member that extends from the inboard member with the pivot axis retained by the pivot member. The pivot mount of the left rack subassembly can further comprise an upper member fixed to the inboard member, the upper member for being fixed against the upper edge of the left sidewall, and the pivot mount of the right rack subassembly can further comprise an upper member fixed to the inboard member, the upper member for being fixed against the upper edge of the right sidewall. The pivot mounts of the left and right rack subassemblies so constructed can establish the pivot axis of the support arm below the upper edge of the left and right sidewalls respectively when the inboard member is fixed against the inner surface of the sidewall and the upper member is fixed against the upper edge of the sidewall. Moreover, the pivot mount of each of the left and right rack subassemblies can establish the pivot axis of the support arm inwardly toward a centerline of the truck bed relative to the left and right sidewalls respectively when the inboard member is fixed against the inner surface of the sidewall and the upper member is fixed against the upper edge of the sidewall. In one example, first and second pivot members extend from the inboard member in spaced relation, and a proximal end of the support arm is pivotally retained between the first and second pivot members.

The proximal segment of each support arm can be considered to have a longitudinal centerline extending from the pivot axis, and the proximal segment can be considered to have a first side that faces generally outwardly from the truck bed when the support arm is in the upright position and a second side that faces generally inwardly from the truck bed when the support arm is in the upright position. A selective fixation mechanism can be employed to selectively fix each support arm in the upright position. In one example, the upright position of each support arm comprises an angle $\alpha$ of the longitudinal centerline of the proximal segment of the support arm inwardly toward a centerline of the truck bed away from vertical. With that, the proximal segments of the support arms are inwardly angled when the collapsible cargo rack is in the use configuration to establish a self-stabilizing construction.

Where the upright position of each support arm comprises an angle $\alpha$ of the longitudinal centerline of the proximal segment of the support arm inwardly toward a centerline of the truck bed away from vertical, the distal segment of each support arm can be angled toward the first side of the longitudinal centerline of the proximal segment. For example, the distal segment of each support arm can be angled toward the first side of the longitudinal centerline of the proximal segment by approximately the angle $\alpha$. With that, when the arms are angled by the angle $\alpha$ toward a centerline of the truck bed away from vertical, the distal segments of the support arm will tend to return to vertical and substantially parallel dispositions.

The selective fixation mechanism can comprise a fixation point, which can take the form of an aperture, in the proximal segment of each support arm spaced distally from the pivot axis, a fixation point, which again can take the form of an aperture, on the pivot mount spaced in correspondence in distance from the pivot axis to the fixation point fixed to the proximal segment of each support arm, and a fastening mechanism for selectively fixing the fixation points in relation to one another. The fixation mechanism could, for example, comprise a set pin. The fixation point fixed to the proximal segment of each support arm can be retained within a lobe fixed to extend from the first side of the proximal segment of each support arm, such as by comprising an aperture in the lobe.

The pivot mount of the left rack subassembly can have an inboard member, such as an inboard plate, for being fixed against the inner surface of the left sidewall of the truck bed with a proximal surface in juxtaposition with the inner surface of the left sidewall and a pivot member, such as a pivot plate, that extends from the inboard member with the pivot axis retained by the pivot member. Likewise, the pivot mount of the right rack subassembly can comprise an inboard member for being fixed against the inner surface of the right sidewall of the truck bed with a proximal surface in juxtaposition with the inner surface of the right sidewall and a pivot member that extends from the inboard member with the pivot axis retained by the pivot member. The pivot axis of each rack subassembly can be retained by the pivot member at a distance from the proximal surface of the inboard member, and wherein the fixation point on the pivot mount is disposed at a distance from the proximal surface of the inboard member approximately equal to the distance at which the pivot axis of each rack subassembly is retained from the proximal surface of the inboard member.

Under particular practices of the invention, the first end of the lateral support member of the lateral support subassembly matingly engages the distal segment of the support arm of the left rack subassembly, and the second end of the lateral support member of the lateral support subassembly matingly engages the distal segment of the support arm of the right rack subassembly. For instance, a first sleeve can be fixed to a first end of the lateral support member for matingly receiving the distal segment of the support arm of the left rack subassembly, and a second sleeve can be fixed to a second end of the lateral support member for matingly receiving the distal segment of the support arm of the right rack subassembly. The first and second sleeves can be substantially parallel.

In such embodiments, the proximal segment of each support arm can be considered to have a longitudinal centerline extending from the pivot axis with a first side that faces generally outwardly from the truck bed when the support arm is in the upright position and a second side that faces generally inwardly from the truck bed when the support arm is in the upright position. A selective fixation mechanism can selectively fix the support arms in the upright position with that upright position comprising an angle α of the longitudinal centerline of the proximal segment of the support arm inwardly toward a centerline of the truck bed away from vertical. Further, the distal segment of each support arm can be angled toward the first side of the longitudinal centerline of the proximal segment by approximately the angle α so that the distal segments return to approximately vertical and parallel positions.

Where a first sleeve is fixed to a first end of the lateral support member and a second sleeve is fixed to a second end of the lateral support member, the first and second sleeves can be considered to have heights and the distal segments of the support arms can each have a length greater than the height of the first and second sleeves. With that, the distal portions of the distal segments project beyond the sleeves to provide a barrier to inadvertent lateral movement of cargo retained by the collapsible cargo rack. For example, the distal segments of the support arms can each have a length at least approximately one and one-half times, potentially at least approximately two times, the height of the first and second sleeves. In other embodiments, the sleeves fixed to the first and second ends of the lateral support member can extend, such as generally perpendicularly to the lateral support member, at a height sufficient to establish a barrier to inadvertent lateral movement of cargo retained by the collapsible cargo rack.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The collapsible cargo rack disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
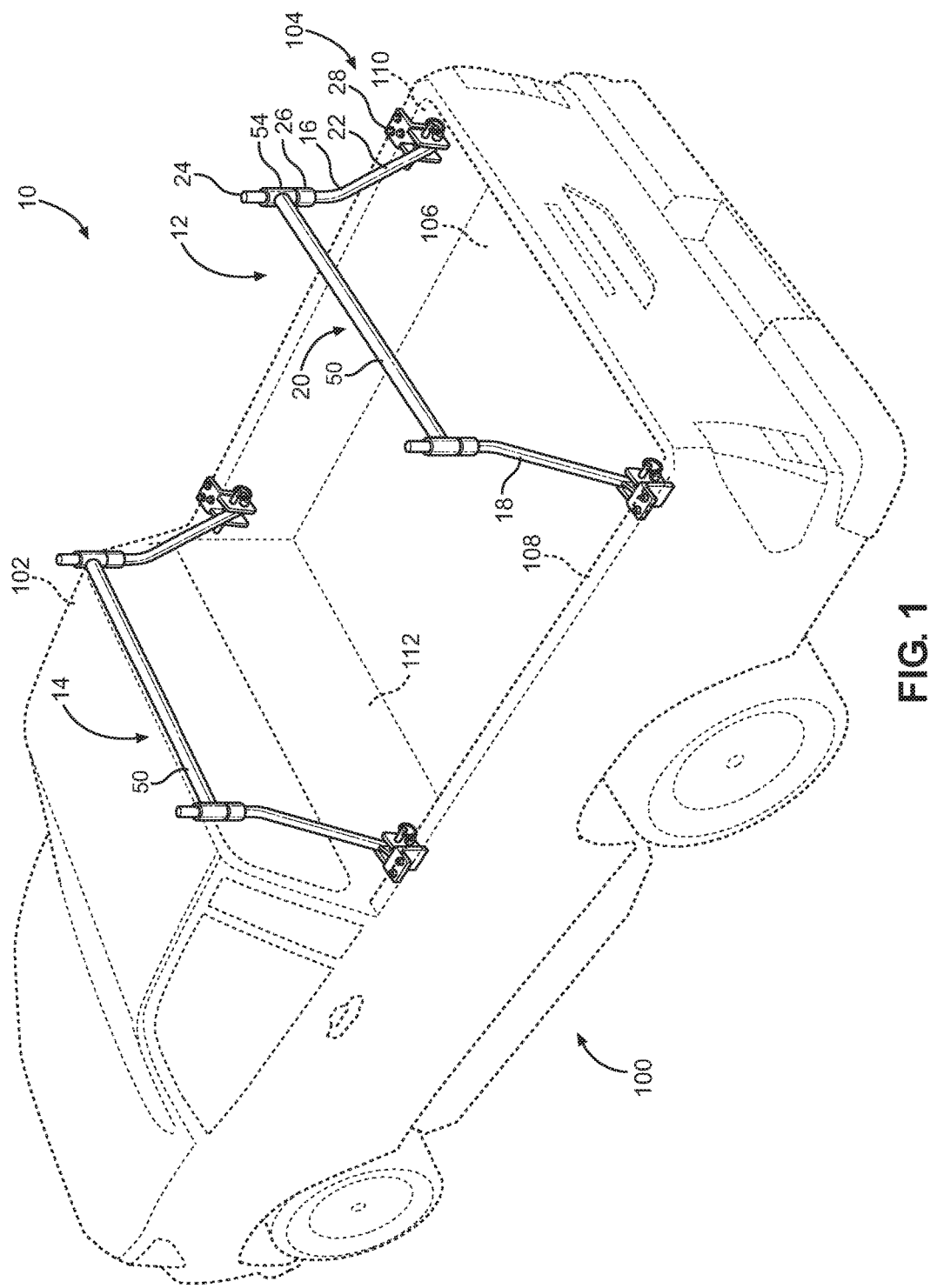
FIG. 1 is a perspective view of a collapsible cargo rack according to the present invention applied to a pickup truck and in a use configuration.
Figure 2:
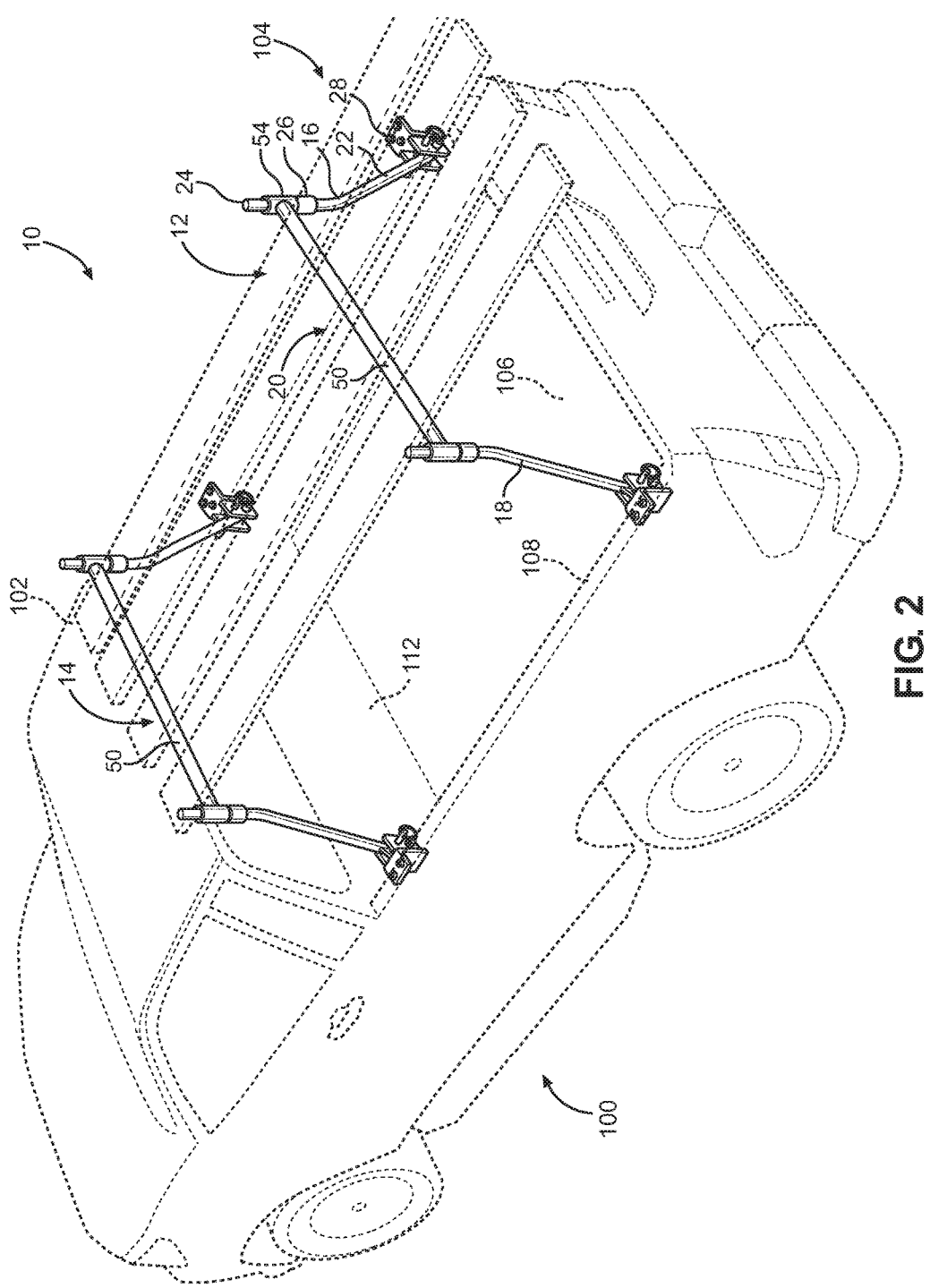
FIG. 2 is a further perspective view of the collapsible cargo rack applied to a pickup truck and in a use configuration retaining cargo.

Looking more particularly to the drawings, a collapsible cargo rack as taught herein is indicated generally at 10 in FIGS. 1 and 2. There, the collapsible cargo rack 10 is applied to a pickup truck 100 that has a cab 102 for passengers and a truck bed 104 for cargo. The truck bed 104 is formed with a floor 106, a left sidewall 108, a right sidewall 110, an anterior wall 112 immediately behind the truck cab 102, and a tailgate 114 that is pivotally retained at a posterior end of the floor 106. In the depicted application, the collapsible cargo rack 10 has a first collapsible cargo rack assembly 12 attached to the truck bed 104 adjacent to the anterior wall 112 and a second collapsible cargo rack assembly 14 attached to the truck bed 104 adjacent to the tailgate 114.

It will be understood, however, that practices of the invention could be carried forth with just a first cargo rack assembly 12, which could be secured adjacent to an anterior end of the truck bed 104, adjacent to a posterior end of the truck bed 104, or at some other location. It would also be possible for more than two cargo rack assemblies 12 and 14 to be employed. While the collapsible cargo rack 10 is described and depicted generally in relation to a pickup truck 100, there is no such limitation as to the use of the rack 10, and it could readily be applied to other vehicles. Still further, the first and second cargo rack assemblies 12 and 14 depicted herein are, in substance, identical, but it will be further understood that the collapsible cargo rack 10 could be employed in relation to other types of racks and support systems and methods. For instance, a collapsible cargo rack 10 according to the invention disposed posteriorly on the truck bed 104 might be employed in combination with a fixed cargo rack (not shown) disposed anteriorly on the truck bed 104 immediately behind the truck cab 102.

The collapsible cargo rack 10 can be further understand with additional reference to FIGS. 3 through 9 where the first cargo rack assembly is again indicated at 12 with it being understood that second and further cargo rack assemblies 14 could be similarly or differently constructed. The cargo rack assembly 12 has a right rack subassembly 16, a left rack subassembly 18, and a lateral support subassembly 20 that can be selectively retained and supported by the right and left subassemblies 16 and 18 when the cargo rack 10 is in a use configuration as in FIG. 3. The lateral support subassembly 20 can be selectively detached from the right and left subassemblies 16 and 18 thereby to permit the right and left subassemblies 16 and 18 to be adjusted to the retracted, visually and physically unobtrusive positions of FIG. 6.

Each of the right and left rack subassemblies 16 and 18 has a support arm 25 that is pivotally retained by a pivot mount 28. Each support arm 25 has an elongate proximal segment 22, a distal segment 24, and a stop 26 at a base of the distal segment 24 and adjacent to a distal end of the proximal segment 22. Tie-down anchors 56, such as tie-down cleats 56, can be fixed in relation to the cargo rack assemblies 12 and 14, such as by being fixed to the support arms 25 and, additionally or alternatively, to the pivot mounts 28. Each pivot mount 28 has what can be referred to as an upper base plate 30 and an inner base plate 34. The base plates 30 and 34 are fixed in a right-angle relationship, such as by being integrally formed, welded, or otherwise fixed to one another so that edges of the plates 30 and 34 form a corner. First and second flanges 36 and 38 project generally perpendicularly from the inner base plate 34 and perpendicularly to the corner between the base plates 30 and 34 in a generally parallel, spaced relationship.

The pivot mounts 28 of the right and left rack subassemblies 16 and 18 can be fixed to the truck bed 104 in opposition, such as adjacent to the anterior or posterior ends of the right and left sidewalls 110 and 108. The pivot mounts 28 can be fixed in place relative to the sidewalls 110 and 108 by any effective method, including mechanical fasteners 32, welding, or any other method or combination of methods. The upper base plate 30 can be disposed atop the respective sidewall 110 or 108, and the inner base plate 32 can be disposed to overlie the inner face of the sidewall 110 or 108. With the pivot mounts 28 so disposed, the flanges 36 and 38 of the opposed pivot mounts 28 project toward one another and inwardly into the bed 104 of the truck 100. When so installed, the flanges 36 and 38 are disposed interior to the sidewalls 108 and 110 and below, or with at least a portion thereof below, the upper edges of the sidewalls 108 and 110. So mounted, the flanges 36 and 38 can be considered to have a lower portion and an upper portion.

For each pivot mount 28, the proximal end of the proximal segment 22 of the support arm 25 is pivotally retained at a pivot axis 40 in the lower portions of the flanges 36 and 38. The pivot axis 40 is generally parallel to a longitudinal orientation of the truck bed 104 and to the longitudinal orientations of the sidewalls 108 and 110. The pivot axis 40 could be formed, for example, by a bolt, also indicated at 40, that passes through the first flange 36, through the proximal end of the proximal segment 22, and through the second flange 38. With that, the support arms 25 can pivot about pivot axes 40 aligned with the longitudinal of the truck bed 104.

Figure 3:
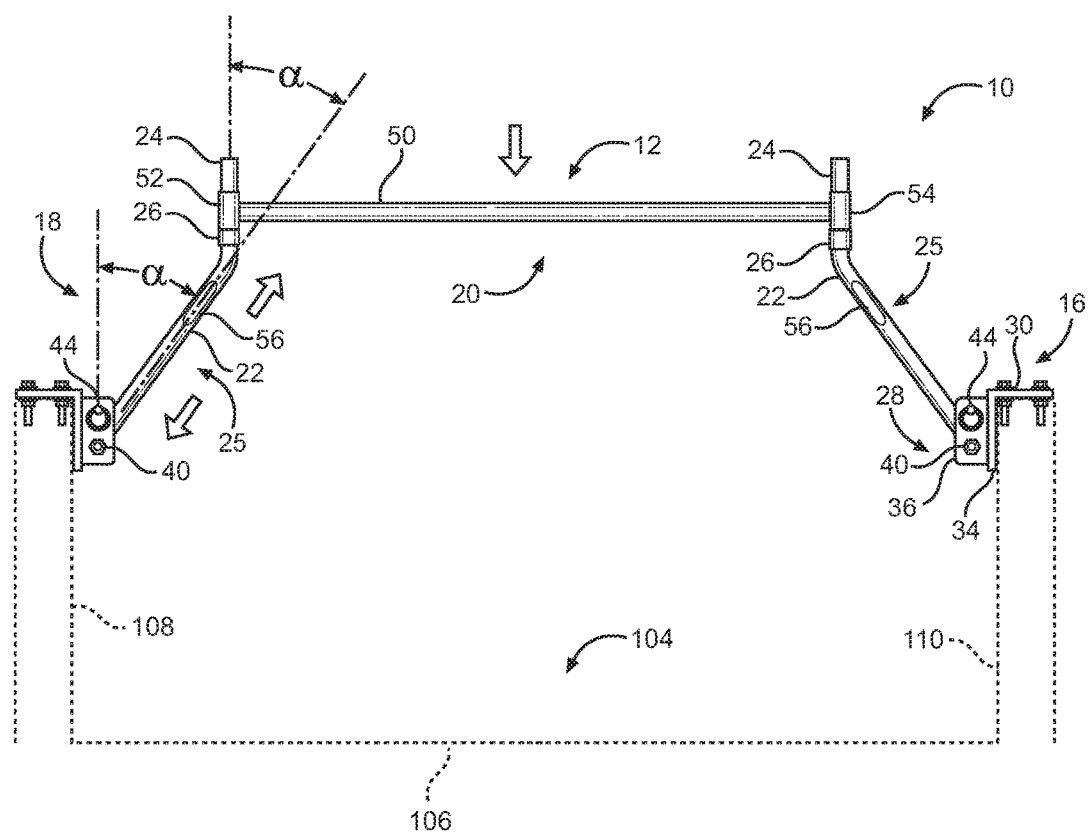
FIG. 3 is a view in rear elevation of the collapsible cargo rack applied to a pickup truck and in a use configuration.

As is illustrated in FIG. 3, the elongate proximal segments 22 of the support arms 25 can be considered to have longitudinal centerlines extending from their pivot axes 40. The elongate proximal segments 22 have first or upper sides, which may alternatively be referred to as outer sides, that face upwardly and outwardly when the support arms 25 are in the upright support configuration of FIG. 3, but which face inwardly when the support arms 25 are in the lowered, retracted configuration of, for example, FIG. 5. The elongate proximal segments 22 have second or lower sides, which may alternatively be referred to as inner sides, that face downwardly and inwardly when the support arms 25 are in the upright support configuration of FIG. 3, but which face outwardly when the support arms 25 are in the lowered, retracted configuration of, for example, FIG. 5.

Figure 4:
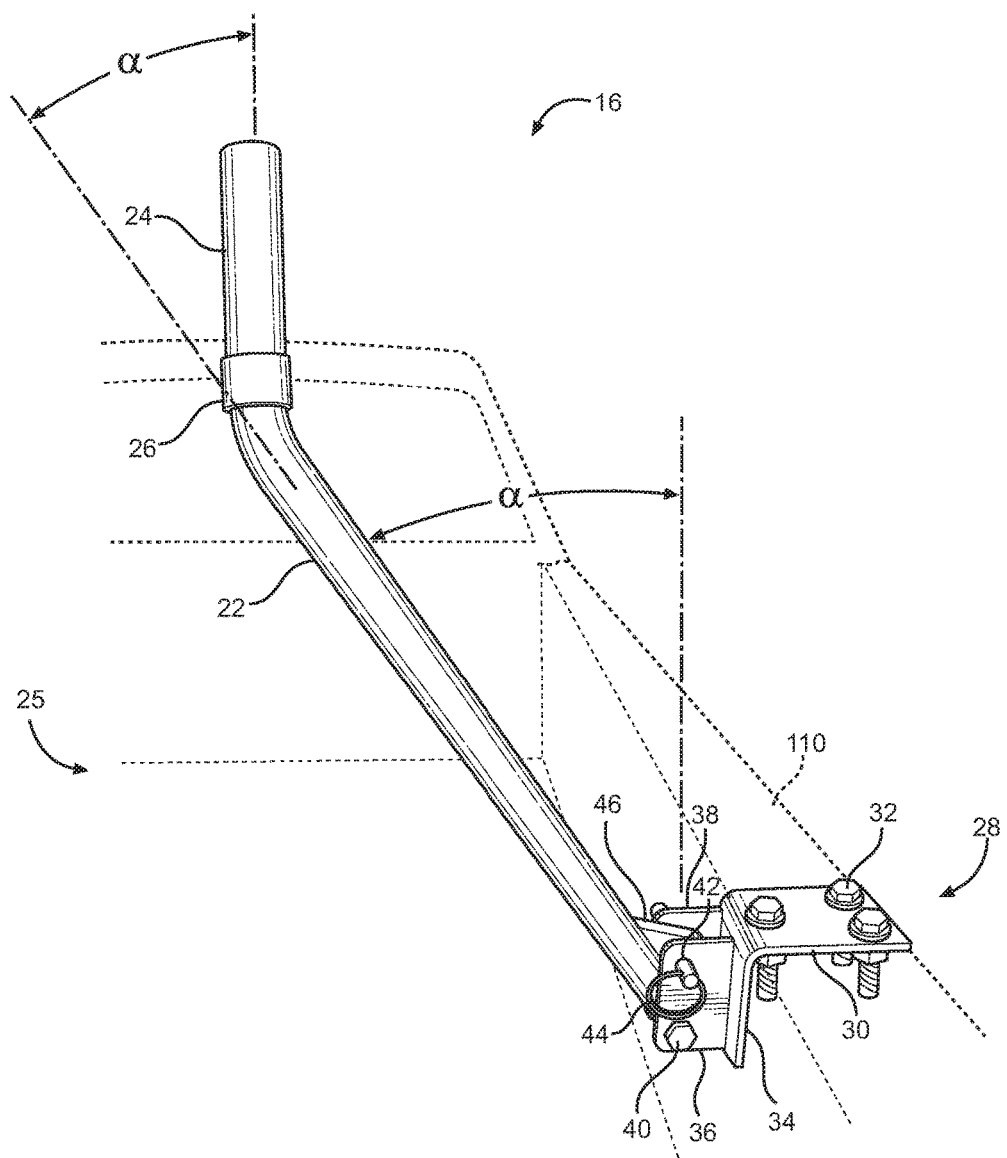
FIG. 4 is a perspective view of a support subassembly of the collapsible cargo rack in an upright configuration.
Figure 5:
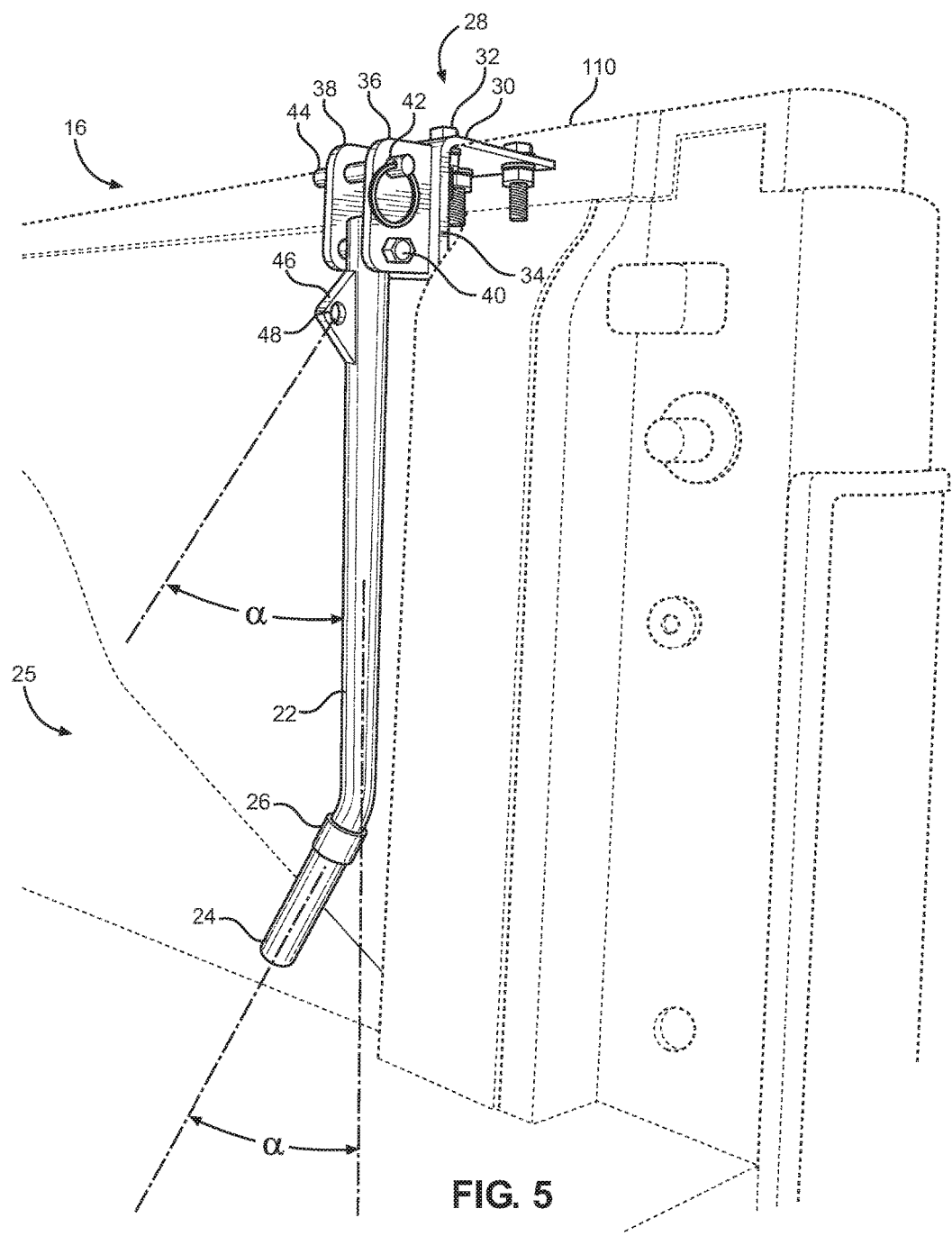
FIG. 5 is a perspective view of the support subassembly in a retracted configuration.

Looking, for example, to FIGS. 4 and 5, each support arm 25 has a fixation point 48 spaced distally in relation to the pivot axis 40, and the pivot mounts 28, more particularly the flanges 36 and 38, have fixation points 42 disposed spaced above the pivot axis 40. In this embodiment, the fixation points 42 and 48 comprise apertures 42 and 48, but other fixation points and types of fixation points 42 and 48 are possible and would readily occur to one skilled in the art with an awareness of the invention. Each should be considered to be within the scope of the invention except as the claim might be expressly limited. The fixation points 42 can be selectively fixed in relation to one another by any effective fixation mechanism, such as but not limited to a set pin 44 that can be selectively inserted through the apertures 42 and 48 forming the fixation points 42 and 48.

The fixation points 42 and 48 are disposed such that, when the points 42 and 48 are aligned, the proximal segment 22 of each support arm 25 is fixed at an inward angle toward a centerline of the truck bed 104 by an angle $\alpha$. The disposition of the fixation points 42 and 48 necessary to produce the inward angle $\alpha$ could be achieved in a number of ways, such as by having the fixation point 42 disposed farther from the base plate 34 than the pivot axis 40, by having the fixation point 48 disposed outboard or outwardly of the outer sides of the longitudinal centerlines, or by some other combination or alternative thereof.

The fixation point 48 in the present embodiment is established outwardly of the outer sides of the longitudinal centerlines by a lobe 46 secured distally to the pivot axis 40 and the provision of an aperture 48 in the lobe 46 as the fixation point 48. Here, the fixation point 42 in the flanges 36 and 38 is approximately vertically above the pivot axis 40 when the pivot mounts 28 are installed as shown and described. Alternatively stated, the fixation point 42 and the pivot axis 40 are approximately equidistant from the inner base plate 34. The fixation point 48 in the lobe 46 is disposed along a radial line from the pivot axis 40 that is spaced by angle α from the longitudinal centerline of the proximal segment 22 of the support arm 25. Under this construction, the support arms 25 can be pivoted to the upright, support positions illustrated, for example, in FIG. 1 where the arms 25 are angled inwardly by angle α to cause the fixation points 42 and 48 to align.

The fixation points 42 and 48 can be selectively fixed in place by a selective fixation mechanism to lock the arms 25 in the upright configuration. In this case, the selective fixation mechanism comprises a set pin 44. However, any fixation mechanism should be considered to be within the scope of the invention except as it might be expressly limited by the claims.

The lateral support subassembly 20 has a support bar 50 with a first end and a second end. The first end of the support bar 50 can be selectively attached to the distal end of the support arm 25 of the right rack subassembly 16, and the second end of the support bar 50 can be selectively attached to the distal end of the support arm 25 of the left rack subassembly 18. With that, when the support arms 25 are pivoted to the upright configuration of FIG. 3, the support bar 50 can be disposed to span between the distal ends of the support arms 25 of the rack subassemblies 16 and 18 thereby to permit a support surface for cargo.

The selective attachment of the first and second ends of the support bar 50 to the distal ends of the support arms 25 could be carried out in a number of ways. In the present embodiment, a first sleeve 52 is fixed to the first end of the support bar 50, and a second sleeve 54 is fixed to the second end of the support bar 50. The first and second sleeves 52 and 54 are shaped and sized to receive the distal segments 24 of the support arms 25 therethrough in a mating relationship. In the depicted embodiment, the distal segments 24 of the support arms 25 are cylindrical, and the sleeves 52 and 54 are cylindrical with an inner diameter sized to closely receive the distal segments 24 of the support arms 25. The stops 26 of each support arm 25 have dimensions larger than the inner diameters of the sleeves, such as by themselves being cylindrical sleeves fixed to the support arms 25 at the lower ends of the distal segments 24, such as by welding, integral formation, mechanical fasteners, or any other method or combination thereof.

The distal segments 24 of the support arms 25 are angled away from the longitudinal centerlines of the elongate proximal segments 22 of the support arms 25 to the first or upper sides of the proximal segments 22, which is outwardly when the arms 25 are in the upright configuration. With that, while the elongate proximal segments 22 of the support arms 25 are fixed at an inward angle toward a centerline of the truck bed 104 by an angle α when the arms 25 are in an upright configuration, the distal segments 24 tend to return to a vertical orientation. The distal segments 24 of the support arms 25 in this embodiment are angled away from the longitudinal centerlines of the elongate proximal segments 22 of the support arms 25 to the first or upper sides of the proximal segments, outwardly when the support arms 25 are in an upright configuration, by angle α substantially equaling angle α by which the proximal portions 22 of the support arms 25 are angled inwardly from vertical when the support arms 25 are in an upright configuration.

With that, the distal segments 24 of the support arms 25 are disposed in a vertical orientation when the support arms 25 are in the upright configuration of FIG. 3 so that the distal segments 24 of the support arms 25 are substantially parallel to one another. The first and second sleeves 52 and 54 of the lateral support subassembly 20, which are fixed parallel to one another, can thus be slid over the distal segments 24 of the support arms 25 to cause the lateral support bar 50 to span laterally across the pickup bed 104.

Where the inner diameters or other inner dimensions of the first and sleeves 52 and 54 are marginally greater than the outer diameters or other outer dimensions of the distal segments 24 of the support arms 25, the sleeves 52 and 54 and the distal segments 24 will also cooperate to add stability to the rack assembly 12. The sleeves 52 and 54 will tend to restrict the distal segments 24 and the support arms 25 in general from unintended pivoting, and the distal segments 24 will tend to restrict the sleeves 52 and 54 and the lateral support subassembly 20 in general from unintended displacement.

As shown, for example, in FIGS. 1 and 3, the distal segments 24 can have a length measured from the stops 26 greater than a height of the sleeves 52 and 54. With that, the distal segments 24 extend beyond the sleeves 52 and 54 to form upstanding barriers to lateral movement of cargo 200 disposed atop the lateral support bar 50 of the lateral support subassembly 20. The length of the distal segments 24 could, for instance, be at least one and one-half times the height of the sleeves 52 and 54. In the depicted embodiment, the length of the distal segments 24 is at least approximately twice the height of the sleeves 52 and 54.

The components of the collapsible cargo rack 10 can be formed from materials and with cross sections, dimensions, and other structural details suitable for, among other things, the intended cargo 200 and the vehicle 100 to be fitted. In contemplated embodiments, the plates 30, 32, 36, and 38, the support arms 25, and the lateral support bar and sleeves 50, 52, and 54 of the lateral support subassembly 20 can be formed from a metal alloy, such as steel or other suitably strong stock. The support arms 25 and the lateral support bar 50 could be round, square, or other cross sections, such as by being formed of tubular or solid rods. The sleeves 52 and 54 and the stops 26 could be crafted from tubular rods.

Figure 6:
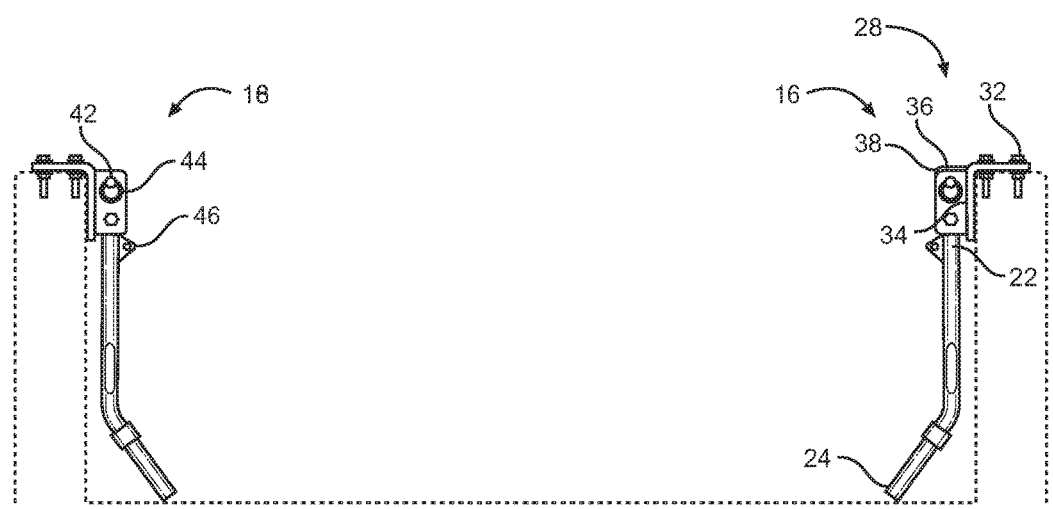
FIG. 6 is a view in rear elevation of the collapsible cargo rack in a retracted configuration.
Figure 7:
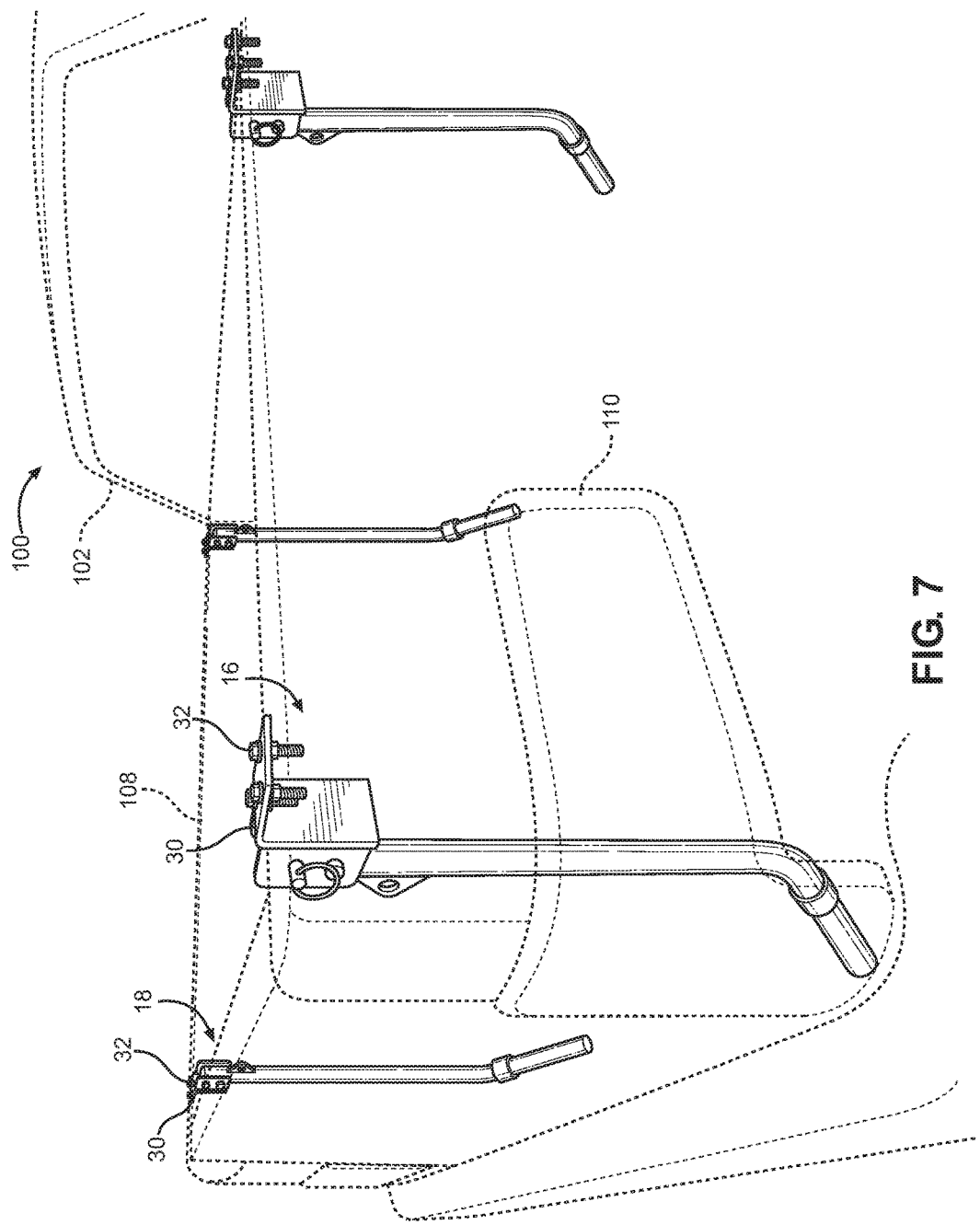
FIG. 7 is a perspective view of the collapsible cargo rack applied to a pickup truck and in a collapsed configuration.
Figure 8:
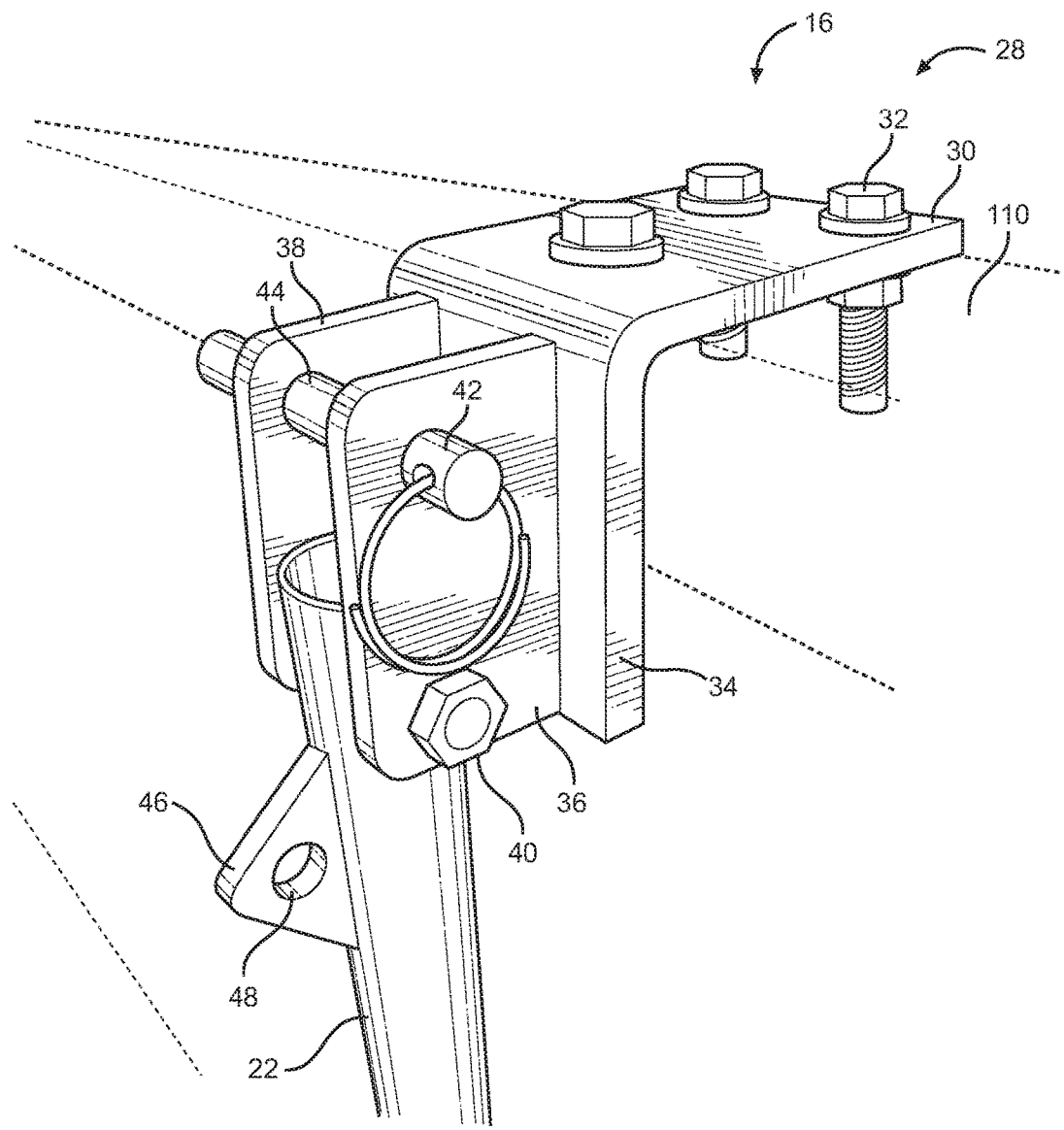
FIG. 8 is an amplified perspective view of the pivot mount for the collapsible cargo rack in a retracted configuration.
Figure 9:
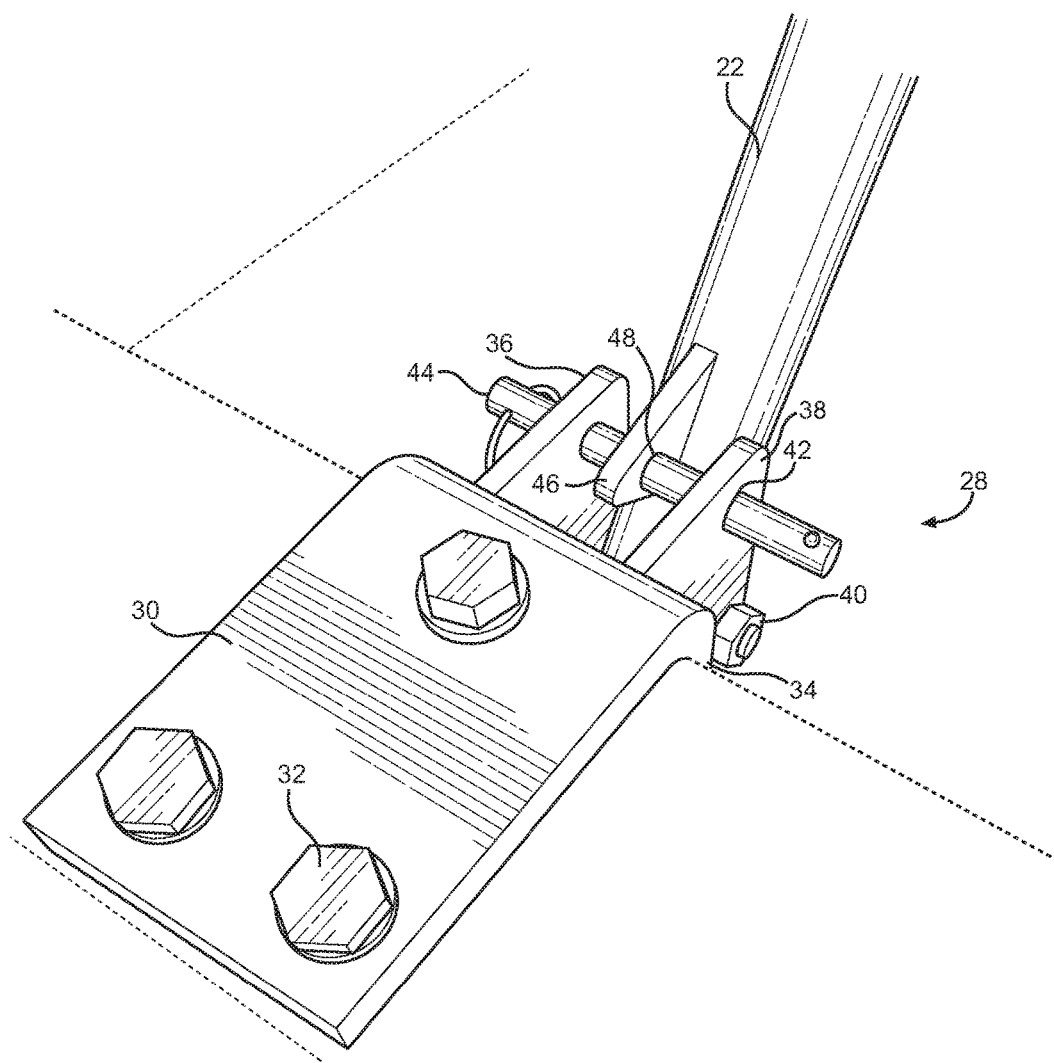
FIG. 9 is an alternative amplified perspective view of the pivot mount for the collapsible cargo rack in an upright configuration.

Under the construction so depicted and described, the collapsible cargo rack 10 can be readily adjusted between a storage configuration as in FIGS. 6 through 8 and a use configuration as in FIGS. 1 through 3. In the storage configuration, the lateral support subassembly 20 is removed from the right and left rack subassemblies 16 and 18, and the support arms 25 are pivoted to the lowered position. When the arms 25 are pivoted to the lowered position of FIGS. 6 though 8, for instance, and the lateral support subassembly 20 is stowed, the collapsible cargo rack 10 is rendered visually and practically unobtrusive. With the pivot axes 40 below the upper surfaces of the sidewalls 108 and 110 of the truck bed 104 and the inboard plate 34 and the pivot plates 36 and 38 substantially below the upper surfaces of the sidewalls 108 and 110, only the top plate 30 and any fasteners 32 remain exposed topside. Moreover, with the pivot axes 40 disposed interior to the sidewalls 108 and 110, the support arms 25 can be pivoted so that the proximal support segments 22 are in immediate contact with the inner surfaces of the sidewalls 108 and 110 in a substantially unobtrusive position visually and practically.

When necessary, the collapsible cargo rack 10 can be readily reconfigured to the use configuration by a simple pivoting of the support arms 25 to their upright configurations to cause the apertures forming the fixation points 42 and 48 to align. Then, the fixation points 42 and 48 can be selectively fixed in relation to one another, in this embodiment by passing the set pins 44 through the apertures 42 and 48 in the pivot plates 36 and 38 of the pivot mount 28 and the lobe 46 of the support arm 25. With that, the support arms 25 are fixed with the proximal support segments 22 disposed inwardly angled away from vertical at the angle α while the distal segments 24 of the support arms 25 are disposed vertically and in a substantially parallel relationship. The lateral support subassembly 20 can then be engaged with the right and left subassemblies 16 and 18 by sliding the sleeves 52 and 54 over the distal segments 24 of the support arms 24 to cause the support bar 50 to span the space between the arms 25 and laterally across the truck bed 104. As shown in FIG. 2, elongate cargo 200 can then be supported for transport atop the support bar or support bars 50 of first and, potentially, second rack assemblies 12 and 14. Notably, the collapsible cargo rack 10 can be adjusted between storage and use configurations without a need for tools and in an exceedingly rapid manner.

The collapsible cargo rack 10 is stabilized in a plurality of ways. For example, the set pins 44 fix the support arms 25 in their upright configuration and against inadvertent movement, which in turn prevents inadvertent movement of the lateral support subassembly 20. Moreover, the inward angle α of the proximal support segments 22 of the arms 25 cause them to resist lateral movement toward the respective pivot mount 28. Still further, the sleeves 52 and 54 fixed to the ends of the lateral support bar 50 tend to lock the distal segments 22 of the support arms 25 and thus the support arms 25 and the rack 10 in general against pivoting. As a result, an exceedingly stable structure is formed in a quick and effective manner to enable to transport of elongate cargo 200.

Figure 10:
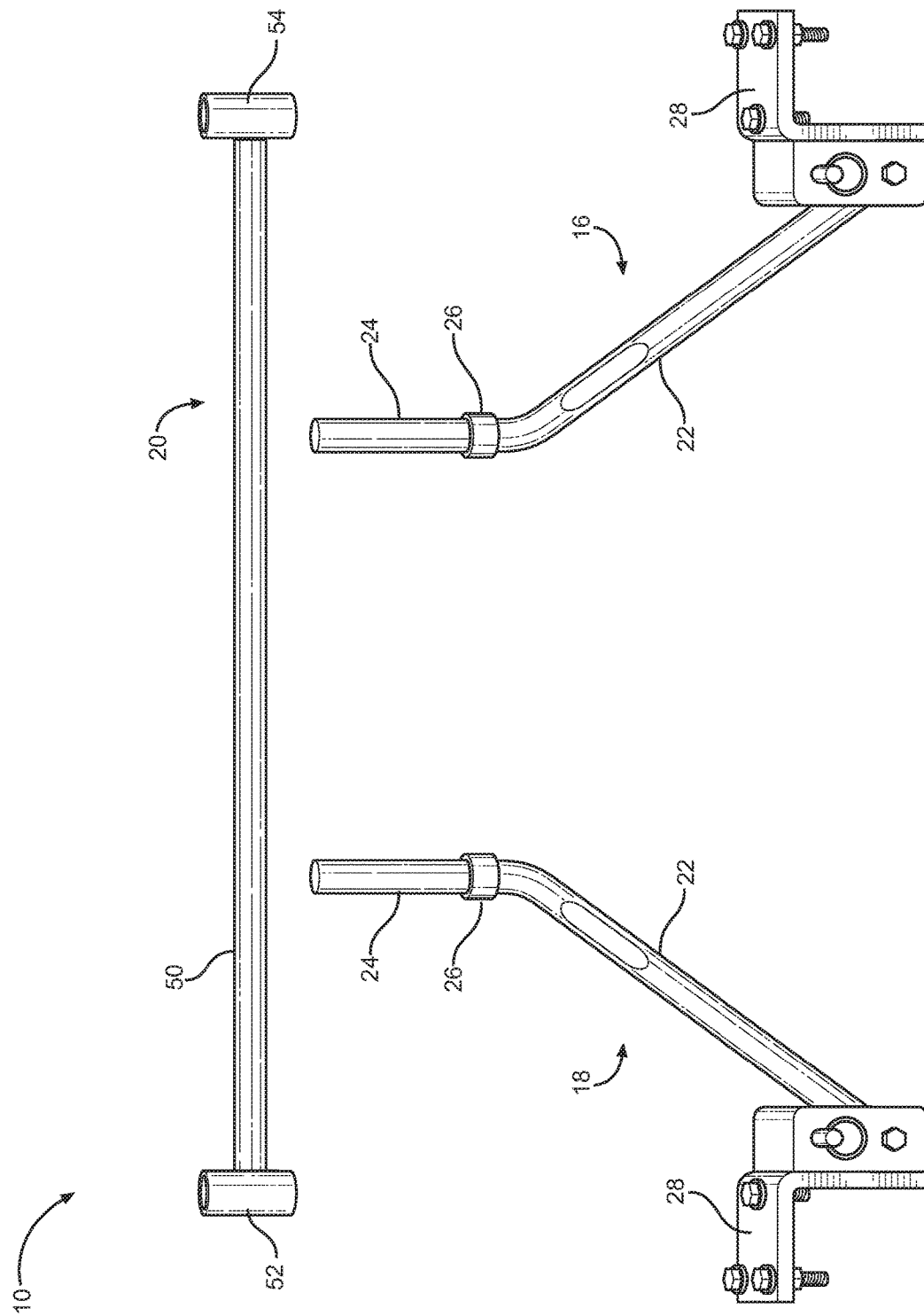
FIG. 10 is a top plan view of the collapsible cargo rack embodied as a kit.
Figure 11:
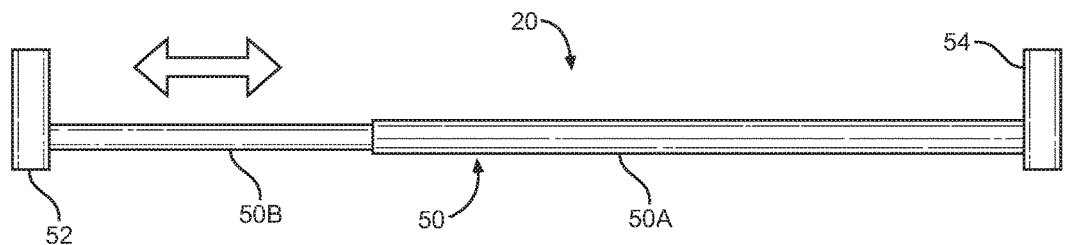
FIG. 11 is a top plan view of an alternative lateral support member for use with embodiments of the collapsible cargo rack.
Figure 12:
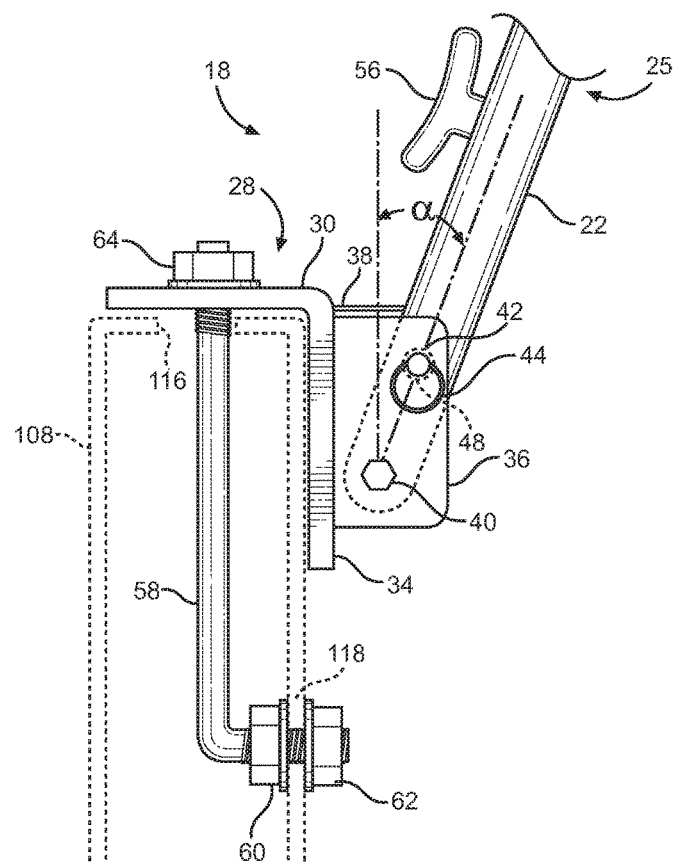
FIG. 12 is a view in rear elevation of an alternative support subassembly according to the present invention in an upright configuration.

It will again be understood that the collapsible cargo rack 10 and the components thereof are subject to alternative embodiments within the scope of the invention except as it might be expressly limited by the claims. Turning, for instance, to FIG. 11, an alternative lateral support subassembly 20 is shown, and an alternative left rack subassembly 18 is depicted in FIG. 12. The right rack subassembly 18 could be similarly constructed, and the right and left rack subassemblies 16 and 18 could be employed with the lateral support subassemblies 20 shown, for example, in FIGS. 10 and 11 or, potentially, with a differently constructed lateral support subassembly 20. Again, right and left rack subassemblies 16 and 18 and a lateral support subassembly 20 can cooperate to form cargo rack assemblies 12 and 14 with a use configuration and a retracted, visually and physically unobtrusive configuration.

The rack subassembly 18 has a support arm 25 that is pivotally retained by a pivot mount 28. The support arm 25 has an elongate proximal segment 22 and a distal segment (not shown) that could be constructed substantially as described and shown previously. Each pivot mount 28 again has what can be referred to as an upper base plate 30 and an inner base plate 34. The base plates 30 and 34 are fixed in a right-angle relationship, such as by being integrally formed, welded, or otherwise fixed to one another so that edges of the plates 30 and 34 form a corner. First and second flanges 36 and 38 project generally perpendicularly from the inner base plate 34 and perpendicularly to the corner between the base plates 30 and 34 in a generally parallel, spaced relationship.

The pivot mount 28 of the rack subassembly 16 and 18 again can be fixed to the truck bed 104 in opposition, such as adjacent to the anterior or posterior ends of the right and left sidewalls 110 and 108 of the truck bed 104 as shown previously. The upper base plate 30 can be disposed atop the respective sidewall 110 or 108, and the inner base plate 32 can be disposed to overlie the inner face of the sidewall 110 or 108. With the pivot mounts 28 so disposed, the flanges 36 and 38 of the opposed pivot mounts 28 project toward one another and inwardly into the bed 104 of the truck 100. When so installed, the flanges 36 and 38 are disposed interior to the sidewalls 108 and 110 and below, or with at least a portion thereof below, the upper edges of the sidewalls 108 and 110. So mounted, the flanges 36 and 38 can be considered to have a lower portion and an upper portion.

The pivot mount 28 in this embodiment, however, can be fixed in place relative to the sidewalls 108 and 110 with the sidewall 108 being used as an example by use of the pre-existing stake holes 116 in the sidewalls 108 and 110 of the truck bed 104. This too could be accomplished in a number of ways within the scope of the invention. In the depicted embodiment, a bolt 58, which can be L-shaped, can fasten the pivot mount 28 in place relative to the sidewall 108. One leg of the L-shaped bolt 58 can be disposed generally vertically within the sidewall 108 with an end of the bolt 58 projecting through the stake hole 116 while a second leg of the L-shaped bolt 58 projects through an aperture 108 in the inner wall of the sidewall 108. The end portions of the legs of the bolt 58 can be threaded. The second leg of the bolt 58 can be secured in place by a threaded fastening mechanism 60 disposed interior to the sidewall 108 in combination with a threaded fastening mechanism 62 threaded onto the bolt 58 exterior to the sidewall 108 thereby to sandwich the inner wall of the sidewall 108 therebetween. Each threaded fastening mechanism 60 and 62 could include, for instance, a nut and a large washer or flange. With the bolt 58 thus fixed in place, the upper and inner base plates 30 and 32 can be applied to align with the stake hole 116 with the end of the first leg of the bolt 58 projecting through an aperture in the upper plate 30. A threaded fastening mechanism 64, which again could comprise a nut and a washer, can then be employed to lock the plates 30 and 32 and the pivot mount 28 in general in place relative to the respective sidewall 108 or 110.

For each pivot mount 28, the proximal end of the proximal segment 22 of the support arm 25 is again pivotally retained at a pivot axis 40 in the lower portions of the flanges 36 and 38. As before, the pivot axis 40 is generally parallel to a longitudinal orientation of the truck bed 104 and to the longitudinal orientations of the sidewalls 108 and 110. The pivot axis 40 could be formed, for example, by a bolt 40 that passes through the first flange 36, through the proximal end of the proximal segment 22, and through the second flange 38. With that, the support arms 25 can pivot about pivot axes 40 aligned with the longitudinal of the truck bed 104.

Each support arm 25 again has a fixation point 48 spaced distally in relation to the pivot axis 40, and the flanges 36 and 38 have fixation points 42 disposed spaced above the pivot axis 40 but at a greater distance from the inner base plate 32. The fixation points 42 can be selectively fixed in relation to one another by any effective fixation mechanism, such as but not limited to a set pin 44 that can be selectively inserted through the apertures 42 and 48 forming the fixation points 42 and 48. The fixation points 42 and 48 are disposed such that, when the points 42 and 48 are aligned, the proximal segment 22 of each support arm 25 is fixed at an inward angle toward a centerline of the truck bed 104 by an angle α.

Turning again to FIG. 11, where an alternative lateral support subassembly 20 is shown, the subassembly 20 is founded on a support bar 50 with a first end and a second end. The first end of the support bar 50 can be selectively attached to the distal end of the support arm 25 of the right rack subassembly 16, and the second end of the support bar 50 can be selectively attached to the distal end of the support arm 25 of the left rack subassembly 18. When the support arms 25 are pivoted to the upright configuration of, for instance, FIG. 12, the support bar 50 can be disposed to span between the distal ends of the support arms 25 of the rack subassemblies 16 and 18 thereby to permit a support surface for cargo.

The selective attachment of the first and second ends of the support bar 50 to the distal ends of the support arms 25 could be carried out in a number of ways, including as shown and described previously where a first sleeve 52 is fixed to the first end of the support bar 50 and a second sleeve 54 is fixed to the second end of the support bar 50. The first and second sleeves 52 and 54 are again shaped and sized to receive the distal segments (as shown and described in relation to FIG. 3, for instance) of the support arms 25 therethrough in a mating relationship. In this embodiment, however, the sleeves 52 and 54 fixed to the first and second ends of the lateral support member extend generally perpendicularly to the lateral support bar 50 at a height sufficient to establish a barrier to inadvertent lateral movement of cargo retained by the collapsible cargo rack 10. The particular height of the sleeves 52 and 54 will vary depending, for instance, on the cargo to be retained and transported.

Where a first collapsible cargo rack assembly 12 is attached to the truck bed 104 adjacent to the anterior wall 112 and a second collapsible cargo rack assembly 14 is attached to the truck bed 104 adjacent to the tailgate 114, it is contemplated that the overall heights at which the support bars 50 of the lateral support subassemblies 20 are retained could be the same or different. For instance, to permit lumber and other elongate articles to clear the roof of the cab 102 of the truck 100, the anterior or first collapsible cargo rack assembly 12 could be marginally taller than the posterior or second collapsible cargo rack assembly 14. This could be accomplished in a number of ways, including by having differently sized support arms 25. However, as in the embodiment of FIG. 11, for instance, an adjustment in the height at which the support bar 50 is retained could be realized by having sleeves 52 and 54 with portions of different heights projecting orthogonally to the support bar 50. As is illustrated, for instance, a first portion of each sleeve 52 and 54 of a given height can project to a first side of the support bar 50, and a second portion of each sleeve 52 and 54 of a height greater than the given height of the first portion can project to a second side of the support bar 50. With that, the height at which the support bar 50 is retained by similarly constructed support arms 25 can be adjusted simply by a selective orientation of the lateral support subassembly 20 with either the first or the second portion facing downwardly to engage, for example, the stops 26 illustrated, for example, in FIG. 3.

FIG. 11 illustrates a further potential variation in the lateral support subassembly 20. There, the lateral support bar 50 is telescoping with a first support bar segment 50A that matingly and slidably receives a second support bar segment 50B. With that, the lateral support bar 50 is adjustable in length. The effective width of the lateral support subassembly 20 and the rack assemblies 12 and 14 so formed can be selectively varied to accommodate, for instance, variations in the effective width of a truck bed 104.

With certain details and embodiments of the present invention for a collapsible cargo rack 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. A collapsible cargo rack with a storage configuration and a use configuration for a pickup truck with a truck bed with a left sidewall and a right sidewall, each sidewall with an upper edge and an inner surface, the collapsible cargo rack comprising:

a collapsible cargo rack assembly comprising a left rack subassembly for being secured to the left sidewall of the truck bed, a right rack subassembly for being secured to the right sidewall of the truck bed, and a lateral support subassembly for being selectively retained by the left and right rack subassemblies when the collapsible cargo rack is in a use configuration;

wherein each of the left and right rack subassemblies comprises a pivot mount and a support arm pivotally retained by the pivot mount at a pivot axis of the support arm, each support arm with an elongate proximal segment and a distal segment, wherein the pivot axis of the support arm is substantially longitudinally aligned with the truck bed when the left and right rack subassemblies are secured to the sidewalls of the truck bed, and wherein each support arm can be pivoted from an upright position to a retracted position;

wherein the lateral support subassembly comprises a lateral support member with a first end adapted selectively to engage the distal segment of the support arm of the left rack subassembly and a second end adapted selectively to engage the distal segment of the support arm of the right rack subassembly;

wherein the first end of the lateral support member is adapted to selectively engage the distal segment of the support arm of the left rack subassembly by a first sleeve fixed to the first end of the lateral support member to selectively receive the distal segment of the support arm of the left rack subassembly in a slidable and mating relationship and wherein the second end of the lateral support member is adapted to selectively engage the distal segment of the support arm of the right rack subassembly by a second sleeve fixed to the second end of the lateral support member to selectively receive the distal segment of the support arm of the right rack subassembly in a slidable and mating relationship;

wherein the collapsible cargo rack assembly can be disposed in the use configuration with the support arm of each of the left and right rack subassemblies pivoted to the upright position, the first end of the lateral support member engaged with the distal segment of the support arm of the left rack subassembly by the distal segment of the support arm of the left rack subassembly slid into the first sleeve fixed to the first end of the lateral support member, and the second end of the lateral support member engaged with the distal segment of the support arm of the right rack subassembly by the distal segment of the support arm of the right rack subassembly slid into the second sleeve fixed to the second end of the lateral support member and wherein the collapsible cargo rack assembly can be reconfigured to the storage configuration by a sliding disengagement of the first and second sleeves fixed to the first and second ends of the lateral support member from the distal ends of the support arms and a pivoting of the support arms to the retracted position.

2. The collapsible cargo rack of claim 1 further comprising a pickup truck with a truck bed with a left sidewall and a right sidewall wherein the pivot mount of each of the left and right rack subassemblies establishes the pivot axis of the support arm below the upper edge of the left and right sidewalls respectively.

3. The collapsible cargo rack of claim 1 further comprising a pickup truck with a truck bed with a left sidewall and a right sidewall wherein the pivot mount of each of the left and right rack subassemblies establishes the pivot axis of the support arm inwardly toward a centerline of the truck bed from to the left and right sidewalls respectively.

4. The collapsible cargo rack of claim 3 wherein the pivot mount of each of the left and right rack subassemblies establishes the pivot axis of the support arm below the upper edge of the left and right sidewalls respectively.

5. The collapsible cargo rack of claim 1 wherein the pivot mount of the left rack subassembly comprises an inboard member for being fixed against the inner surface of the left sidewall of the truck bed and a pivot member that extends from the inboard member with the pivot axis retained by the pivot member and wherein the pivot mount of the right rack subassembly comprises an inboard member for being fixed against the inner surface of the right sidewall of the truck bed and a pivot member that extends from the inboard member with the pivot axis retained by the pivot member.

6. The collapsible cargo rack of claim 5 wherein the pivot mount of the left rack subassembly further comprises an upper member fixed to the inboard member in a right-angle relationship, the upper member for being fixed against the upper edge of the left sidewall, and wherein the pivot mount of the right rack subassembly further comprises an upper member fixed to the inboard member, the upper member for being fixed against the upper edge of the right sidewall.

7. The collapsible cargo rack of claim 6 wherein the pivot mount of each of the left and right rack subassemblies establishes the pivot axis of the support arm below the upper edge of the left and right sidewalls respectively when the inboard member is fixed against the inner surface of the sidewall and the upper member is fixed against the upper edge of the sidewall.

8. The collapsible cargo rack of claim 7 wherein the pivot mount of each of the left and right rack subassemblies establishes the pivot axis of the support arm inwardly toward a centerline of the truck bed relative to the left and right sidewalls respectively when the inboard member is fixed against the inner surface of the sidewall and the upper member is fixed against the upper edge of the sidewall.

9. The collapsible cargo rack of claim 5 wherein first and second pivot members extend from the inboard member in spaced relation and wherein a proximal end of the support arm is pivotally retained between the first and second pivot members.

10. The collapsible cargo rack of claim 1 wherein the proximal segment of each support arm has a longitudinal centerline extending from the pivot axis wherein the proximal segment has a first side that faces generally outwardly from the truck bed when the support arm is in the upright position and a second side that faces generally inwardly from the truck bed when the support arm is in the upright position and further comprising a selective fixation mechanism for selectively fixing each support arm in the upright position.

11. The collapsible cargo rack of claim 10 wherein the upright position of each support arm comprises an angle $\alpha$ of the longitudinal centerline of the proximal segment of the support arm inwardly toward a centerline of the truck bed away from vertical.

12. The collapsible cargo rack of claim 11 wherein the distal segment of each support arm is angled toward the first side of the longitudinal centerline of the proximal segment.

13. The collapsible cargo rack of claim 12 wherein the distal segment of each support arm is angled toward the first side of the longitudinal centerline of the proximal segment by approximately the angle $\alpha$.

14. The collapsible cargo rack of claim 13 wherein the distal segments of the support arms are substantially parallel when the support arms are in the upright position.

15. The collapsible cargo rack of claim 10 wherein the selective fixation mechanism comprises a fixation point fixed to the proximal segment of each support arm spaced distally from the pivot axis, a fixation point on the pivot mount spaced in correspondence to the fixation point fixed to the proximal segment of each support arm in distance from the pivot axis, and a fastening mechanism for selectively fixing the fixation points in relation to one another.

16. The collapsible cargo rack of claim 15 wherein the fastening mechanism comprises a set pin.

17. A collapsible cargo rack with a storage configuration and a use configuration for a pickup truck with a truck bed with a left sidewall and a right sidewall, each sidewall with an upper edge and an inner surface, the collapsible cargo rack comprising:
   a collapsible cargo rack assembly comprising a left rack subassembly for being secured to the left sidewall of the truck bed, a right rack subassembly for being secured to the right sidewall of the truck bed, and a lateral support subassembly for being selectively retained by the left and right rack subassemblies when the collapsible cargo rack is in a use configuration;
   wherein each of the left and right rack subassemblies comprises a pivot mount and a support arm pivotally retained by the pivot mount at a pivot axis of the support arm, each support arm with an elongate proximal segment and a distal segment, wherein the pivot axis of the support arm is substantially longitudinally aligned with the truck bed, and wherein each support arm can be pivoted from an upright position to a retracted position;
   wherein the lateral support subassembly comprises a lateral support member with a first end adapted selectively to engage the distal segment of the support arm of the left rack subassembly and a second end adapted selectively to engage the distal segment of the support arm of the right rack subassembly;

wherein the collapsible cargo rack assembly can be disposed in the use configuration with the support arm of each of the left and right rack subassemblies pivoted to the upright position, the first end of the lateral support member engaged with the distal segment of the support arm of the left rack subassembly, and the second end of the lateral support member engaged with the distal segment of the support arm of the right rack subassembly and wherein the collapsible cargo rack assembly can be reconfigured to the storage configuration by a disengagement of the first and second ends of the lateral support member from the distal ends of the support arms and a pivoting of the support arms to the retracted position;

wherein the proximal segment of each support arm has a longitudinal centerline extending from the pivot axis wherein the proximal segment has a first side that faces generally outwardly from the truck bed when the support arm is in the upright position and a second side that faces generally inwardly from the truck bed when the support arm is in the upright position and further comprising a selective fixation mechanism for selectively fixing each support arm in the upright position, wherein the selective fixation mechanism comprises a fixation point fixed to the proximal segment of each support arm spaced distally from the pivot axis, a fixation point on the pivot mount spaced in correspondence to the fixation point fixed to the proximal segment of each support arm in distance from the pivot axis, and a fastening mechanism for selectively fixing the fixation points in relation to one another, and wherein the fixation point fixed to the proximal segment of each support arm comprises a lobe fixed to extend from the first side of the proximal segment of each support arm.

18. The collapsible support rack of claim 17 wherein the fixation point further comprises an aperture in the lobe.

19. The collapsible cargo rack of claim 17 wherein the pivot mount of the left rack subassembly comprises an inboard member for being fixed against the inner surface of the left sidewall of the truck bed with a proximal surface in juxtaposition with the inner surface of the left sidewall and a pivot member that extends from the inboard member with the pivot axis retained by the pivot member, wherein the pivot mount of the right rack subassembly comprises an inboard member for being fixed against the inner surface of the right sidewall of the truck bed with a proximal surface in juxtaposition with the inner surface of the right sidewall and a pivot member that extends from the inboard member with the pivot axis retained by the pivot member, wherein the pivot axis of each rack subassembly is retained by the pivot member at a distance from the proximal surface of the inboard member, and wherein the fixation point on the pivot mount is disposed at a distance from the proximal surface of the inboard member approximately equal to the distance at which the pivot axis of each rack subassembly is retained from the proximal surface of the inboard member.

20. The collapsible cargo rack of claim 1 wherein the first and second sleeves are substantially parallel.

21. The collapsible cargo rack of claim 20 wherein the proximal segment of each support arm has a longitudinal centerline extending from the pivot axis wherein the longitudinal centerline of the proximal segment has a first side that faces generally outwardly from the truck bed when the support arm is in the upright position and a second side that faces generally inwardly from the truck bed when the support arm is in the upright position and further comprising a selective fixation mechanism for selectively fixing the support arms in the upright position wherein the upright position of each support arm comprises an angle $\alpha$ of the longitudinal centerline of the proximal segment of the support arm inwardly toward a centerline of the truck bed away from vertical and wherein the distal segment of each support arm is angled toward the first side of the longitudinal centerline of the proximal segment by approximately the angle $\alpha$.

22. The collapsible cargo rack of claim 21 wherein each of the first and second sleeves has a height and wherein the distal segments of the support arms each has a length greater than the height of the first and second sleeves.

23. The collapsible cargo rack of claim 22 wherein the distal segments of the support arms each has a length at least approximately one and one-half times the height of the first and second sleeves.

24. The collapsible cargo rack of claim 22 wherein the distal segments of the support arms each has a length at least approximately twice the height of the first and second sleeves.

25. The collapsible cargo rack of claim 21 wherein the first and second sleeves each have a first portion of the sleeve of a given height that projects to a first side of the lateral support member and a second portion of a height greater than the given height of the first portion that projects to a second side of the lateral support member whereby a height at which the lateral support member is retained can be adjusted by a selective orientation of the lateral support member.

26. The collapsible cargo rack of claim 1 wherein the lateral support member is adjustable in length.

27. The collapsible cargo rack of claim 1 wherein each of the first and second sleeves has an inner dimension sized to receive the distal segments of the support arms of the left and right rack subassemblies in a slidable and mating relationship.

28. The collapsible cargo rack of claim 27 wherein the first and second sleeves are substantially cylindrical with inner diameters sized to receive the distal segments of the support arms of the left and right rack subassemblies in a slidable and mating relationship.

* * * * *